US006360529B1

United States Patent
Surnilla et al.

(10) Patent No.: US 6,360,529 B1
(45) Date of Patent: Mar. 26, 2002

(54) METHOD AND APPARATUS FOR ENABLING LEAN ENGINE OPERATION UPON ENGINE START-UP

(75) Inventors: Gopichandra Surnilla, West Bloomfield; Michael John Cullen, Northville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/528,062

(22) Filed: Mar. 17, 2000

(51) Int. Cl.$^7$ ................................................. F01N 3/00

(52) U.S. Cl. ............................. 60/274; 60/285; 60/286; 60/301

(58) Field of Search ........................ 60/274, 277, 285, 60/286, 301

(56) References Cited

U.S. PATENT DOCUMENTS

| | | | |
|---|---|---|---|
| 4,036,014 A | | 7/1977 | Ariga |
| 4,964,272 A | | 10/1990 | Kayanuma |
| 5,410,873 A | | 5/1995 | Tashiro |
| 5,412,945 A | | 5/1995 | Katoh et al. |
| 5,419,122 A | | 5/1995 | Tabe et al. |
| 5,437,153 A | | 8/1995 | Takeshima et al. |
| 5,452,576 A | | 9/1995 | Hamburg et al. |
| 5,483,795 A | | 1/1996 | Katoh et al. |
| 5,626,014 A | | 5/1997 | Hepburn et al. |
| 5,626,117 A | | 5/1997 | Wright et al. |
| 5,713,199 A | | 2/1998 | Takeshima et al. |
| 5,715,679 A | | 2/1998 | Asanuma et al. |
| 5,722,236 A | | 3/1998 | Cullen et al. |
| 5,729,971 A | * | 3/1998 | Matsuno et al. .............. 60/277 |
| 5,771,685 A | | 6/1998 | Hepburn |
| 5,771,686 A | | 6/1998 | Pischinger et al. |
| 5,778,666 A | | 7/1998 | Cullen et al. |
| 5,802,843 A | | 9/1998 | Kurihara et al. |
| 5,803,048 A | | 9/1998 | Yano et al. |
| 5,832,722 A | | 11/1998 | Cullen et al. |
| 5,865,027 A | * | 2/1999 | Hanafusa et al. ............. 60/277 |
| 5,929,320 A | * | 7/1999 | Yoo ............................ 60/277 |

(List continued on next page.)

FOREIGN PATENT DOCUMENTS

| | | |
|---|---|---|
| EP | 0 351 197 A1 | 1/1990 |
| EP | 0 503 882 A1 | 9/1992 |
| EP | 0 580 389 A1 | 1/1994 |
| WO | 98/27322 | 6/1998 |

OTHER PUBLICATIONS

Dynamic Behavior Analysis of Three–Way Catalytic Reaction.*
Engineered Control Strategies for Improved Catalytic Control of $NO_x$ in Lean Burn Applications.*
Application of Exhaust Gas Oxygen Sensor to the Study/ of Storage effects in Automotive Three–Way Catalysis.*
W.H. Holl, "Air Fuel Control to Reduce Emissions I. Engine–Emissions Relationships", SAE 800051, Feb. 25–29, 1980.
Wei–Ming Wang, "Air–Fuel Control to Reduce Emissions, II. Engine–Catalyst Characterization Under Cyclic Conditions", SAE 800052, Feb. 25–29, 1980.

*Primary Examiner*—Thomas Denion
*Assistant Examiner*—Diem Tran
(74) *Attorney, Agent, or Firm*—Allan J. Lippa

(57) ABSTRACT

A method and system for controlling the operation of "lean-burn" internal combustion engines, wherein initial values for measures representing current levels of $NO_x$ and $SO_x$ stored in an emissions control device, such as a lean $NO_x$ trap, upon vehicle start-up are determined based at least in part upon values for the measures immediately preceding engine shut-off. Such initial values obviate the need for performing a purge event immediately upon engine start-up in appropriate circumstances, such as a brief engine shutdown, whereby the fuel economy penalty associated with such an initial purge event is avoided.

20 Claims, 1 Drawing Sheet

U.S. PATENT DOCUMENTS

| | | |
|---|---|---|
| 5,938,715 A | 8/1999 | Zang et al. |
| 5,966,930 A * | 10/1999 | Hatano et al. ............... 60/277 |
| 5,974,788 A | 11/1999 | Hepburn et al. |
| 5,974,791 A | 11/1999 | Hirota et al. |
| 5,974,794 A * | 11/1999 | Gotoh et al. ............... 60/286 |
| 5,979,161 A * | 11/1999 | Hanafusa et al. ............ 60/286 |
| 5,992,142 A | 11/1999 | Pott |
| 5,996,338 A | 12/1999 | Hirota |
| 6,012,428 A | 1/2000 | Yano et al. |
| 6,023,929 A | 2/2000 | Ma |
| 6,058,700 A | 5/2000 | Yamashita et al. |
| 6,073,440 A * | 6/2000 | Douta et al. ............... 60/277 |
| 6,128,899 A * | 10/2000 | Oono et al. ............... 60/285 |

* cited by examiner

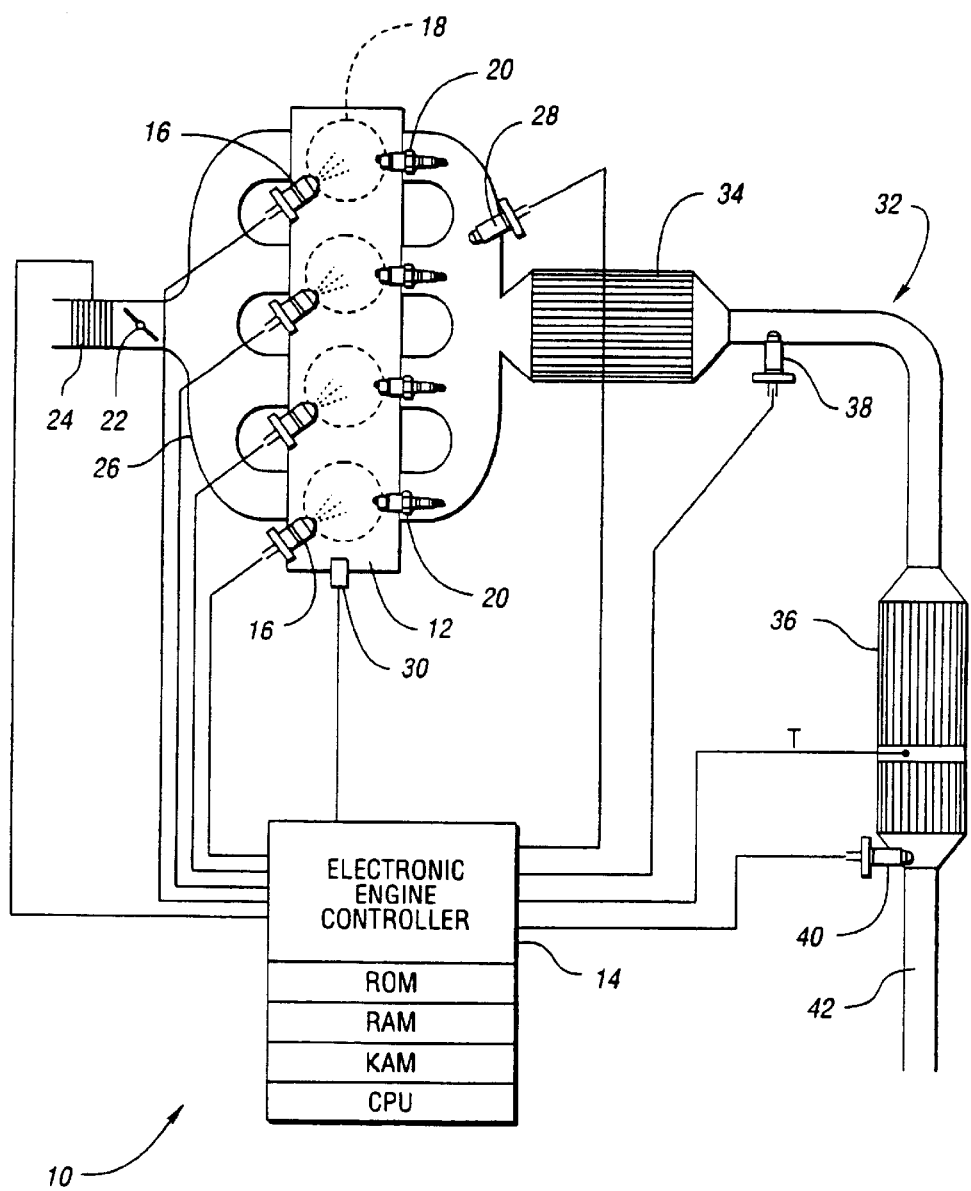

METHOD AND APPARATUS FOR ENABLING LEAN ENGINE OPERATION UPON ENGINE START-UP

BACKGROUND OF THE INVENTION

1. Field of the Invention

The invention relates to methods and systems for controlling the operation of "lean-burn" internal combustion engines used in motor vehicles to obtain improvements in vehicle fuel economy.

2. Background Art

The exhaust gas generated by a typical internal combustion engine, as may be found in motor vehicles, includes a variety of constituent gases, including hydrocarbons (HC), carbon monoxide (CO), nitrogen oxides ($NO_2$) and oxygen ($O_2$). The respective rates at which an engine generates these constituent gases are typically dependent upon a variety of factors, including such operating parameters as air-fuel ratio (8), engine speed and load, engine temperature, ambient humidity, ignition timing ("spark"), and percentage exhaust gas recirculation ("EGR"). The prior art often maps values for instantaneous engine-generated or "feedgas" constituents, such as $NO_x$, based, for example, on detected values for instantaneous engine speed and engine load.

To limit the amount of feedgas constituents, such as HC, CO and $NO_x$, that are exhausted through the vehicle's tailpipe to the atmosphere as "emissions," motor vehicles typically include an exhaust purification system having an upstream and a downstream three-way catalyst. The downstream three-way catalyst is often referred to as a $NO_x$ "trap." Both the upstream and downstream catalyst store $NO_x$ when the exhaust gases are "lean" of stoichiometry and releases previously-stored $NO_x$ for reduction to harmless gases when the exhaust gases are "rich" of stoichiometry.

Under one prior art approach, the duration of any given lean operating excursion (or its functional equivalent, the frequency or timing of each purge event) is controlled based upon an estimate of how much $NO_x$ has accumulated in the trap since the excursion began. For example, in U.S. Pat. No. 5,473,887 and U.S. Pat. No. 5,437,153, a controller seeks to estimate the amount of $NO_x$ stored in the trap by accumulating estimates for feedgas $NO_x$ which are themselves obtained from a lookup table based on engine speed, or on engine speed and load (the latter perhaps itself inferred, e.g., from intake manifold pressure). The controller discontinues the lean operating excursion when the total feedgas $NO_x$ measure exceeds a predetermined threshold representing the trap's nominal $NO_x$-storage capacity. In this manner, the prior art seeks to discontinue lean operation, with its attendant increase in engine-generated $NO_x$, before the trap is fully saturated with $NO_x$, because engine-generated $NO_x$ would thereafter pass through the trap and effect an increase in tailpipe $NO_x$ emissions.

With the trap thus deemed to have been "filled" with $NO_x$, the prior art teaches the immediate switching of the engine operating condition to a rich engine operating condition characterized by combustion of an air-fuel ratio that is substantially rich of the stoichiometric air-fuel ratio. The rich operating condition is continued, for example, for either a fixed time period sufficient to purge the trap of all stored $NO_x$, or until a downstream oxygen sensor indicates the "break-through" of rich exhaust gas, thereby signaling the release from the trap of all stored $NO_x$.

Because of the risk of emissions break-through if the trap is over-filled, the prior art teaches an initialization procedure at engine start-up characterized by the immediate purging of the trap of any stored $NO_x$. Accordingly, immediately upon engine start-up, the controller selects the trap-purging rich engine operating condition and continues to so operate the engine until the trap is confirmed to be empty of stored $NO_x$, either by running rich for a predetermined minimum time period, or until rich exhaust gas is detected downstream of the trap. As a result, each engine start-up incurs an immediate fuel economy penalty.

SUMMARY OF THE INVENTION

It is an object of the invention to control the operation of a lean-burn internal combustion engine at start-up so as to reduce any fuel economy penalty associated with trap initialization.

In accordance with the invention, a method is provided for controlling the operation of a lean-burn internal combustion engine, the exhaust gas from which is directed through an exhaust purification system including a lean $NO_x$ trap which stores an exhaust gas constituent when the exhaust gas is lean and releases previously-stored exhaust gas constituent when the exhaust gas is rich. Under the invention, the method includes determining a first measure representing an amount of the first exhaust gas constituent stored in the device at a time when the engine is shut off; and enabling lean engine operation upon an immediately-subsequent engine start-up based on the first measure. In an exemplary embodiment, the method also includes determining a second measure representing the amount of the first exhaust gas constituent stored in the device at the time of the subsequent engine start-up, wherein the second measure is based at least in part on the first measure and a temperature of the device; and downwardly adjusting the first measure based on the length of time.

In accordance with another feature of the invention, the enabling step preferably includes determining an amount of fuel, in excess of a stoichiometric amount of fuel, required to release substantially all of the previously-stored amount of the exhaust gas constituent based on the first measure; and prohibiting lean engine operation until the engine has been operated at a rich operating condition sufficient to add the excess fuel amount to the exhaust gas passing through the device.

Other objects, features and advantages of the present invention are readily apparent from the following detailed description of the best mode for carrying out the invention when taken in connection with the accompanying drawings.

BRIEF DESCRIPTION OF THE DRAWINGS

The Drawing is a schematic of an exemplary system for practicing the invention.

DETAILED DESCRIPTION OF THE PREFERRED EMBODIMENT

An exemplary system 10 for controlling the operation of a lean-burn internal combustion engine 12 in a motor vehicle (not shown) is illustrated in the Drawing. The exemplary system 10 includes an electronic engine controller 14 having a processor or "CPU" 14a; RAM 14b; and ROM 14a, i.e., a processor-readable storage medium which is encoded with executable instructions for controlling the operation of the engine 12. The engine 12 includes a set of fuel injectors 16 whose operation is controlled by the controller 14. The fuel injectors 16, which are of conventional design, are each positioned to inject fuel into a respective cylinder 18 of the engine 12 in precise quantities as determined by the controller 14. The controller 14 similarly controls the individual operation, i.e., timing, of the current directed through each of a set of spark plugs 20 in a known manner.

The controller 14 also controls an electronic throttle 22 that regulates the mass flow of air into the engine 12. An air mass flow sensor 24, positioned at the air intake of engine's intake manifold 26, provides a signal regarding the air mass flow resulting from positioning of the engine's throttle 22. The air flow signal from the air mass flow sensor 24 is utilized by the controller 14 to calculate an air mass value AM which is indicative of a mass of air flowing per unit time into the engine's induction system.

A first oxygen sensor 28 coupled to the engine's exhaust manifold detects the oxygen content of the exhaust gas generated by the engine 12 and transmits a representative output signal to the controller 14. The first oxygen sensor 28 provides feedback to the controller 14 for improved control of the air-fuel ratio of the air-fuel mixture supplied to the engine 12, particularly during operation of the engine 12 at or near the stoichiometric air-fuel ratio ($\lambda$=1.00). A plurality of other sensors, including an engine speed sensor and an engine load sensor, indicated generally at 30, also generate additional signals in a known manner for use by the controller 14. It will be understood that the engine load sensor 30 can be of any suitable configuration, including, by way of example only, an intake manifold pressure sensor, an intake air mass sensor, or a throttle position/angle sensor.

An exhaust system 32 receives the exhaust gas generated upon combustion of the air-fuel mixture in each cylinder 18. The exhaust system 32 includes an upstream three-way catalytic converter ("three-way catalyst 34") and a downstream $NO_x$ trap 36. The three-way catalyst 34 contains a catalyst material that chemically alters the exhaust gas generated by combustion of the supplied air-fuel mixture within the cylinders 18 of the engine 12. The resulting catalyzed exhaust gas is directed past a second oxygen sensor 38, through the trap 36, and past a third oxygen sensor 40. The trap 36 functions in a known manner to reduce the amount of engine-generated $NO_x$ exiting the vehicle tailpipe 42 during lean engine operation, based upon such factors as intake air-fuel ratio, trap temperature T (as determined by a trap temperature sensor, not shown), percentage exhaust gas recirculation, barometric pressure, humidity, instantaneous trap "fullness," instantaneous sulfur poisoning, and trap aging effects (due, for example, to permanent thermal ag~ing, or to the "deep" diffusion of sulfur into the core of the trap material which cannot subsequently be purged). While the invention contemplates the use of second and third oxygen sensors 38 and 40 of any suitable type or configuration, in the exemplary system 10, the second and third oxygen sensors 38,40 are conveniently of the "switching" type.

Upon initialization, which typically occurs no later than the commencement of a trap purge event, except as described in greater detail below, the controller 14 resets a run timer used to track a first time period and adjusts the output of the fuel injectors 16 to thereby achieve a lean air-fuel mixture for combustion within each cylinder 18 having an air-fuel ratio greater than about 1.3 times the stoichiometric air-fuel ratio. In accordance with the invention, for each subsequent background loop during lean engine operation, the controller 14 determines a value representing the instantaneous rate FG_NOX_RATE at which $NO_x$ is being generated by the engine 12 as a function of instantaneous engine operating conditions, which may include, without limitation, engine speed, engine load, air-fuel ratio, EGR, and spark.

By way of example only, in a preferred embodiment, the controller 14 retrieves a stored estimate FG_NOX_RATE for the instantaneous $NO_x$-generation rate from a lookup table stored in ROM based upon sensed values for engine speed N and engine load LOAD, wherein the stored estimates FG_NOX_RATE are originally obtained from engine mapping data.

During a first engine operating condition, characterized by combustion in the engine 12 of a lean air-fuel mixture (e.g., $\lambda$>1.3), the controller 14 determines incremental or delta feedgas emissions from the engine, in grams/hr, generated since the last time through this loop, and preferably expressed by the following relationship:

FG_NOX_RATE=FNXXX1(N, LOAD)*FNXXA($\lambda$)*FNXXB(EGRACT) *FNXXC(SPK_DELTA)*FMXXD(ECT-200)

where: FNXXX1(N,LOAD) is a lookup table containing $NO_x$ emission rate values in gram/hr for current engine speed N and engine load LOAD;

FNXXA($\lambda$) is a lookup table for adjusting the FG_NOX_RATE value for air-fuel which inherently adjusts the FG_NOX_RATE value for barometric pressure;

FNXXB(EGRACT) is a lookup table for adjusting the FG_NOX_RATE value for actual exhaust gas recirculation percentage;

FNXXC(SPK_DELTA) is a lookup table for adjusting the FG_NOX_RATE value for the effect of knock sensor or hot open-loop induced spark retard, with $NO_x$ production being reduced with greater spark retard; and FMXXD(ECT-200) is a lookup table for adjusting the FG_NOX_RATE value for the effect of engine coolant temperature above 200° F.

Preferably, the determined feedgas $NO_x$ rate FG_NOX_RATE is further modified to reflect any reduction in feedgas $NO_x$ concentration upon passage of the exhaust gas through the three-way catalyst 34, as through use of a ROM-based lookup table of three-way catalyst efficiency in reducing $NO_x$ as a function of the current air-fuel ratio $\lambda$, to obtain an adjusted instantaneous feedgas $NO_x$ rate FG_NOX_RATE_ADJ. The adjusted feedgas $NO_x$ rate FG_NOX_RATE_ADJ is accumulated over the length of time $t_{i,j}$ that the engine 12 is operated within a given engine speed/load cell for which the feedgas $NO_x$ generation rate $R_{i,j}$ applies, which is typically assumed to be the duration of the control process's nominal background loop, to obtain a value representing an instantaneous amount FG_NOX_ADJ of feedgas $NO_x$ entering the trap during the background loop.

Also during the lean operating condition, the controller 14 calculates an instantaneous value NOX_INCR representing the incremental amount of $NO_x$ stored in the trap 36 during each background loop executed by the controller 14 during a given lean operating condition, in accordance with the following formula:

NOX_INCR=FG_NOX_RATE_ADJ*$t_{i,j}$*$\mu$, where: $\mu$ represents a set of adjustment factors for instantaneous trap temperature T, open-loop accumulation of $SO_x$ in the trap 36 (which, in a preferred embodiment, is itself generated as a function of fuel flow and trap temperature T), desired trap utilization percentage, and a current estimate of the cumulative amount of $NO_x$ which has already been stored in the trap 36 during the given lean operating condition.

The controller 14 thereafter calculates a value TP_NOX_INST based on the difference between the adjusted instantaneous feedgas $NO_x$ value FG_NOX_ADJ and the instantaneous value NOX_INCR representing the incremental amount of $NO_x$ stored in the trap 36. The controller 14 then compares the value TP_NOX_INST to a predetermined threshold level TP_NOX_MAX. If the controller 14 determines that the instantaneous tailpipe emissions value TP_NOX_INST exceeds the predetermined threshold level TP_NOX_MAX, the controller 14 immediately discontinues the on-going lean engine operating condition in favor of either near-stoichiometric engine operating condition or a trap-purging rich engine operating condition.

In accordance with another feature of the invention, in a preferred embodiment, the method further includes generating a value TP_NOX_TOT representing the cumulative amount of $NO_x$ emitted to the atmosphere during a given trap purge-fill cycle, i.e., since the commencement of an immediately-prior trap-purging rich operating condition; generating a value DISTANCE representing a cumulative number of miles that the vehicle has traveled during the given cycle, as by accumulating detected values VS for vehicle speed over time; and determining a modified value TP_NOX_TOT_MOD representing the average tailpipe $NO_x$ emissions in grams per mile using the cumulative tailpipe emissions value TP_NOX_TOT and the accumulated mileage value DISTANCE.

More specifically, when the system 10 is initially operated with a lean engine operating condition, the efficiency of the trap 36 is very high, and the tailpipe $NO_x$ emissions are correlatively very low. As the trap 36 fills, the trap efficiency begins to fall, the tailpipe $NO_x$ emissions value TP_NOX_INST will slowly rise up towards the threshold value TP_NOX_MAX. However, since the initial portion of the lean engine operating condition was characterized by very low tailpipe $NO_x$ emissions, the lean engine operating condition can be maintained for some time after the instantaneous value TP_NOX_INST exceeds the threshold value TP_NOX_MAX before average tailpipe $NO_x$ emissions exceed the threshold value TP_NOX_MAX. Moreover, since a purge event is likewise characterized by very low instantaneous tailpipe $NO_x$ emissions, average tailpipe $NO_x$ emissions are preferably calculated using a time period which is reset at the beginning of the immediately prior purge event.

In accordance with yet another feature of the invention, when determining the value DISTANCE representing the cumulative number of miles traveled by the vehicle during the given cycle, the controller 14 assumes a minimum vehicle speed VS_MIN to thereby provide a single modified emissions control measure TP_NOX_TOT_MOD, expressed in terms of emissions per effective vehicle mile traveled, applicable to vehicle speeds above and below the minimum vehicle speed VS_MIN, including stopped vehicle conditions.

To the extent that the calculated tailpipe $NO_x$ emissions do not exceed the predetermined threshold level, the controller 14 continues to track trap fill time, as follows: the controller 14 iteratively updates a stored value NOX_STORED representing the cumulative amount of $NO_x$ which has been stored in the trap 44 during the given lean operating condition, in accordance with the following formula:

NOX_STORED=NOX_STORED+NOX_INCR

The controller 14 further determines a suitable value NOX_CAP representing the instantaneous $NO_x$-storage capacity estimate for the trap 36. By way of example only, in a preferred embodiment, the value NOX_CAP varies as a function of trap temperature T, as further modified by an adaption factor $K_i$ periodically updated during fill-time optimization to reflect the impact of both temporary and permanent sulfur poisoning, trap aging, and other trap-deterioration effects.

The controller 14 then compares the updated value NOX_STORED representing the cumulative amount of $NO_x$ stored in the trap 36 with the determined value NOX_CAP representing the trap's instantaneous $NO_x$-storage capacity. The controller 14 discontinues the given lean operating condition and schedules a purge event when the updated value NOX_STORED exceeds the determined value NOX_CAP. It will be appreciated that, by discontinuing lean engine operation, it is meant that the controller 14 selects a suitable engine operating condition from either a near-stoichiometric operating region or a rich engine operating region, rather than from a lean engine operating region.

For example, in a preferred embodiment, if the controller 14 determines that the value TP_NOX_INST exceeds the predetermined threshold level TP_NOX_MAX, the controller 14 immediately schedules a purge event using an open-loop purge time based on the current value NOX_STORED representing the cumulative amount of $NO_x$ which has been stored in the trap 44 during the preceding lean operating condition. In this regard, it is noted that the instantaneous trap temperature T, along with the air-fuel ratio and air mass flow rate employed during the purge event, are preferably taken into account in determining a suitable open-loop purge time, i.e., a purge time that is sufficient to release substantially all of the $NO_x$ and oxygen previously stored in the trap 36.

As noted above, a temperature sensor is used to directly measure the trap temperature T; however, it will be appreciated that trap temperature may be inferred, for example, in the manner disclosed in U.S. Pat. No. 5,894,725 and U.S. Pat. No. 5,414,994, which disclosures are incorporated herein by reference.

If, at the end of the purge event, the controller 14 determines that the value TP_NOX_INST continues to exceed the predetermined threshold level TP_NOX_MAX, the controller 14 either selects a near-stoichiometric engine operating condition, or schedules another open-loop purge event.

Preferably, in accordance with another feature of the invention, the controller 14 initializes certain variables in a manner to account for instances where an engine may be turned off for short periods of time during which the trap 36 may not have cooled to ambient temperature. More specifically, rather than assuming that a purge event, with its resulting fuel economy penalty, must be scheduled immediately upon engine start-up in order to assure that a measure representing $NO_x$ stored in the trap 36 may properly be set to a known (zero) value, the controller 14 estimates values NOX_STORED_INIT and SOX_STORED_INIT for the amounts of $NO_x$ and $SO_x$, respectively, which remain stored in the trap 36 at the time of the subsequent engine start-up, preferably as a function of one or more operating parameters, such as the respective values for stored $NO_x$ and stored $SO_x$ immediately preceding engine shut-off, a value TEMP_INIT representative of the instantaneous trap temperature at the time of the subsequent engine start-up, and at least one respective calibratable time constant representing an amount of time for the variable to deteriorate to a value corresponding to the passage of a relatively large amount of time.

More specifically, the controller 14 determines the value NOX_STORED_INIT, representing the amount of $NO_x$ remaining in the trap 36 at the time of the subsequent engine start-up as the lower value of either a time-based bleed-estimated value based on the intervening time interval SOAKTIME and the amount of $NO_x$ believed to be stored in the trap 36 at engine shut-down; and a start-up-temperature-based capacity estimate.

Thus, the controller 14 determines a bleed-based trap initialization variable NOX_STORED_BLEED after a soak time SOAKTIME is expressed as follows:

NOX_STORED_BLEED=NOX_STORED*FNEXP(-SOAK-TIME/NOX_TIME_CONST)

where: FNEXP is a lookup table value that approximates an exponential function;
  SOAKTIME is the time elapsed since the engine was shut down, in seconds; and
  NOX_TIME_CONST is an empirically derived time constant associated with the release from the trap 36 of stored $NO_x$, in seconds.

Because the storage capacity of the trap is typically limited as a function of trap temperature, the controller 14 also determines a temperature-based capacity value NOX_CAP_TEMP as a function of the trap temperature value TEMP_INIT at the time of the subsequent engine start-up, as follows:

NOX_CAP_TEMP=FNXXXX(TEMP_INIT))

where: FNXXXX is a lookup table value of mapped values for trap capacity versus trap temperature T; and
  TEMP_INIT is a value representing the instantaneous trap temperature T at the time of the subsequent engine start-up.

The controller 14 then estimates the amount NOX_STORED_INIT of $NO_x$ stored in the trap 36 upon engine start-up as follows:

NOX_STORED_INIT=MIN(NOX_STORED_BLEED, NOX_CAP_TEMP)

where: MIN(x,y) is a function which selects the lower of the two values, x and y.

While, in the exemplary system 10, the controller 14 preferably samples the output T generated by a temperature sensor to thereby obtain a detected value TEMP_INIT for use in determining the above trap initialization values for remaining $NO_x$ and $SO_x$, the controller 14 alternatively estimates the trap's temperature at the subsequent engine start-up, i.e., after a soak time SOAKTIME using an appropriate algorithm. By way of example only, an exemplary initialization routine for the trap temperature variable TEMP-INIT is preferably expressed as follows:

TEMP_INIT=((TEMP-PREVIOUS–AMBIENT)*FNEXP(-SOAKTIME/TEMP_TIME_CONST)

where: TEMP_PREVIOUS is a value for trap temperature T during the immediately preceding engine operating condition;
  AMBIENT is a measured or inferred value representing current ambient temperature;
  FNEXP is a lookup table value that approximates an exponential function;
  SOAKTIME is the time elapsed since the engine was shut down, in seconds; and
  TEMP_TIME_CONST is an empirically derived time constant associated with the cooling-off of the exhaust gas at an identified location on the trap 36, in seconds.

While the best mode for carrying out the invention has been described in detail, those familiar with the art to which this invention relates will recognize various alternative designs and embodiments for practicing the invention within the scope of the appended claims.

What is claimed is:

1. A method for controlling the operation of an internal combustion engine in a motor vehicle, wherein the engine generates exhaust gas including an exhaust gas constituent, and wherein exhaust gas is directed through an emissions control device before being exhausted to the atmosphere, the device storing the exhaust gas constituent when the exhaust gas directed through the device is lean of stoichiometry and releasing previously-stored exhaust gas constituent when the exhaust gas directed through the device is rich of stoichiometry, the method comprising:
  shutting off the engine at a time when a substantial amount of the first exhaust gas constituent is stored in the device;
  determining a first measure representing the amount of the first exhaust gas constituent stored in the device at the time when the engine is shut off; and
  enabling lean engine operation following an immediately-subsequent engine start-up based on the first measure.

2. The method of claim 1, wherein enabling includes determining an amount of fuel, in excess of a stoichiometric amount of fuel, required to release substantially all of the previously-stored amount of the exhaust gas constituent based on the first measure; and prohibiting lean engine operation following the engine start-up until the engine has been operated at a rich operating condition sufficient to add the excess fuel amount to the exhaust gas passing through the device.

3. A method for controlling the operation of an internal combustion engine in a motor vehicle, wherein the engine generates exhaust gas including an exhaust gas constituent, and wherein exhaust gas is directed through an emissions control device before being exhausted to the atmosphere, the device storing the exhaust gas constituent when the exhaust gas directed through the device is lean of stoichiometry and releasing previously-stored exhaust gas constituent when the exhaust gas directed through the device is rich of stoichiometry, the method comprising:
  determining a first measure representing an amount of the first exhaust gas constituent stored in the device at a time when the engine is shut off;
  enabling lean engine operation upon an immediately-subsequent engine start-up based on the first measure; and
  determining a second measure representing the amount of the first exhaust gas constituent stored in the device at the time of the subsequent engine start-up, wherein the second measure is based at least in part on the first measure and a temperature of the device; and downwardly adjusting the first measure based on the length of time.

4. A method for controlling the operation of an internal combustion engine in a motor vehicle, wherein the engine generates exhaust gas including an exhaust gas constituent, and wherein exhaust gas is directed through an emissions control device before being exhausted to the atmosphere, the device storing the exhaust gas constituent when the exhaust gas directed through the device is lean of stoichiometry and releasing previously-stored exhaust gas constituent when the exhaust gas directed through the device is rich of stoichiometry, the method comprising:

determining a first measure representing an amount of the first exhaust gas constituent stored in the device at a time when the engine is shut off;

enabling lean engine operation upon an immediately-subsequent engine start-up based on the first measure; and determining a first temperature of the device at the time of the subsequent engine start-up.

5. The method of claim 4, wherein determining the first temperature includes detecting a temperature of the device.

6. A method for controlling the operation of an internal combustion engine in a motor vehicle, wherein the engine generates exhaust gas including an exhaust gas constituent, and wherein exhaust gas is directed through an emissions control device before being exhausted to the atmosphere, the device storing the exhaust gas constituent when the exhaust gas directed through the device is lean of stoichiometry and releasing previously-stored exhaust gas constituent when the exhaust gas directed through the device is rich of stoichiometry, the method comprising:

shutting off the engine at a time when a substantial amount of the first exhaust gas constituent is stored in the device;

determining a first measure representing the amount of the first exhaust gas constituent stored in the device at the time when the engine is shut off; and selecting an engine operating condition upon an immediately-subsequent engine start-up based on the first measure.

7. The method of claim 6, wherein selecting includes determining an amount of fuel, in excess of a stoichiometric amount of fuel, required to release substantially all of the previously-stored amount of the exhaust gas constituent based on the first measure.

8. The method of claim 7, wherein selecting further includes operating the engine with an air-fuel mixture rich of a stoichiometric air-fuel mixture to thereby add the excess fuel amount to the exhaust gas passing through the device.

9. The method of claim 8, wherein selecting further includes enabling lean engine operation after operating the engine with the rich air-fuel ratio.

10. The method of claim 6, including determining a length of time from the engine shut-off to the subsequent engine start-up; and downwardly adjusting the first measure based on the length of time.

11. The method of claim 6, including determining a first temperature of the device when the engine is shut off.

12. The method of claim 11, wherein determining the first temperature includes detecting a temperature of the device.

13. A system for controlling the operation of a lean-burn internal combustion engine, the exhaust gas from the engine being directed through an exhaust purification system including a lean $NO_x$ trap, the system comprising:

a controller including a microprocessor arranged to determine a first measure representing an amount of the first exhaust gas constituent stored in the device at a time when the engine is shut off, the controller being further arranged to enable lean engine operation following an immediately-subsequent engine start-up based on the first measure.

14. The system of claim 13, wherein the controller is further arranged to determine an amount of fuel, in excess of a stoichiometric amount of fuel, required to release substantially all of the previously-stored amount of the exhaust gas constituent based on the first measure; and to prohibit lean engine operation following the engine start-up until the engine has been operated at a rich operating condition sufficient to add the excess fuel amount to the exhaust gas passing through the device.

15. The system of claim 13, wherein the controller is further arranged to determine a length of time from the engine shut-off to a subsequent engine start-up; and downwardly adjusting the first measure based on the length of time.

16. The system of claim 13, wherein the controller is further arranged to determine a first temperature of the device when the engine is shut off.

17. A processor-readable storage medium including processor-executable code for determining an ability of an emissions control device for a lean-burn engine to releasably store a constituent of exhaust gas generated by the engine when the engine is operated lean, wherein the storage medium includes:

code for determining at a time the engine is shut off, a first measure representing an amount of the first exhaust gas constituent stored in the device since an immediately-prior device-purging event, and code for enabling a lean operating condition lean engine operation following an immediately-subsequent engine start-up based on the first measure.

18. The storage medium of claim 17, further including code for determining an amount of fuel, in excess of a stoichiometric amount of fuel, required to release substantially all of the previously-stored amount of the exhaust gas constituent based on the first measure; and code for prohibiting lean engine operation following the engine start-up until the engine has been operated at a rich operating condition sufficient to add the excess fuel amount to the exhaust gas passing through the device.

19. The storage medium of claim 17, further including code for determining a length of time from the engine shut-off to a subsequent engine start-up; and downwardly adjusting the first measure based on the length of time.

20. The storage medium of claim 17, further including code of determining a first temperature of the device when the engine is shut off.

* * * * *